Jan. 22, 1957 D. B. LEWIS 2,778,444
AIR CLEANER ASSEMBLY
Filed Feb. 10, 1954

INVENTOR
Donald B. Lewis
BY L. D. Buck
ATTORNEY

United States Patent Office 2,778,444
Patented Jan. 22, 1957

2,778,444

AIR CLEANER ASSEMBLY

Donald B. Lewis, Lapeer, Mich., assignor to General Motors Corporation, Detroit, Mich., a corporation of Delaware Application February 10, 1954, Serial No. 409,390

3 Claims. (Cl. 183—13)

This invention relates to air cleaners generally and more particularly to forced feed liquid bath air cleaners for use with heavy duty air induction equipment.

Heavy duty air induction equipment such as farm implements, military vehicles, earth moving apparatus and the like, which operate over rough terrain and in dust laden atmospheres require effective air filtering devices of great capacity and durability. Such equipment also requires that the filtering devices employed be compactly arranged and readily accessible for repair and maintenance. Liquid bath air cleaners of the forced feed type while most effective for use with the aforementioned equipment generally are required because of their massive size to be divided into separable elements and to be associated through interconnecting fluid flow lines. When so disposed such devices are generally more subject to damage and leave much to be desired with regard to general adaptability to the equipment with which they are to be used.

It is now proposed to provide a forced feed liquid bath air cleaner assembly which is compact, durable, easily located in a minimum of space and is readily accessible for emergency repair or routine maintenance. The proposed assembly includes a liquid reservoir upon which is mounted both the liquid bath air cleaner and the liquid pump for forced feed thereof. The air cleaner is adapted to drain excess liquid carried over into the air cleaner back into the liquid reservoir with the foreign matter which has been separated from the impure air in the air cleaner. The fluid pump is disposed apart from the air cleaner and is adapted to draw clean liquid from the top of the reservoir for recirculation through the air cleaner. Baffling plates are secured across the liquid reservoir to prevent disturbance of the liquid and thereby enable proper settling of the contaminating matter.

Figure 1:
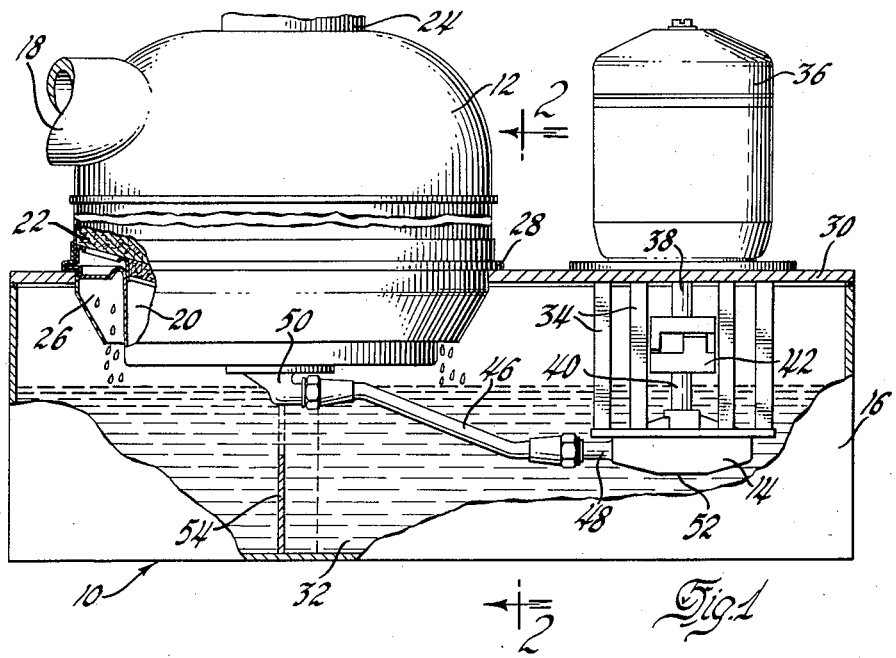

In Figure 1 is shown a forced feed liquid bath air cleaner assembly having parts broken away to more clearly show pertinent features thereof.

Figure 2:
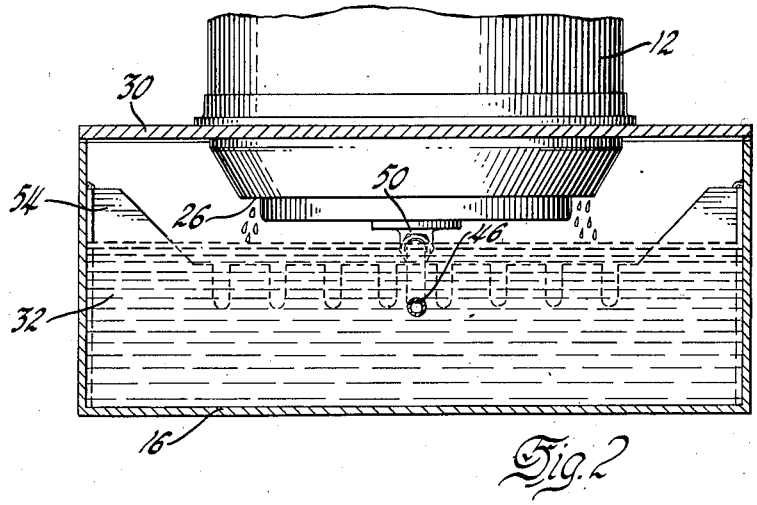

Figure 2 is a cross sectional view taken through Figure 1 substantially in the plane of line 2—2 and viewed in the direction of the arrows thereon.

The air cleaner assembly 10 shown in the drawings includes a liquid bath air cleaner 12 and a fluid pump 14 in association with a fluid tank or liquid reservoir 16. The air cleaner 12 is of the liquid bath type shown in co-pending application S. N. 407,910 filed February 3, 1954, in the name of this same inventor. The air cleaner 12 includes an air inlet conduit 18 through which dust laden or otherwise impure air is introduced to the air cleaner. The inducted air is adapted to pass through a liquid retaining sump and baffle chamber 20 formed in the base of the air cleaner 12, through a maze of filtering material 22 and to be discharged through the air outlet conduit 24 formed in the top of the air cleaner and which comprised air induction means as used with a vehicle engine. Foreign matter carried into the air cleaner 12 with the inducted air is entrapped in the filtering material 22 and is washed from the air cleaner by liquid which is carried by the inducted air from the baffle chamber 20 into the filtering material. Drainage passages 26 are provided within the air cleaner 12 about the baffle chamber 20 and beneath the peripheral areas of the filtering material 22 through which liquid and foreign matter may be removed from the air cleaner to the tank 16.

The air cleaner 12 is provided with a flange 28 therearound for holding the cleaner upon a cover plate 30 of the liquid reservoir 16 and in spaced relation to the liquid 32 adapted to be retained within the reservoir or tank 16. The impurities separated out from the air and the contaminated liquid are adapted to be drained off from the air cleaner and to fall into the liquid reservoir 16. The impurities are there settled out leaving relatively clean liquid near the surface of the tank.

The fluid pump 14 is secured within the liquid reservoir 16 beneath the surface of the liquid 32 retained therein. The pump 14 is secured in spaced relation to the underside of the cover plate 30 by braces 34. The pump 14 is driven by a motor 36 vertically mounted on top of the cover plate 30 and having its shaft 38 coupled to the pump shaft 40 as by flexible coupling 42. A fluid flow conduit 46 is connected to the discharge side 48 of the fluid pump 14 and to a fluid inlet fitting 50 secured to the bottom of the air cleaner. The fitting 50 is adapted to admit fluid to the baffle chamber 20 formed in the air cleaner 12. The fluid pump 14 is provided with fluid inlet openings in the bottom thereof in the general location of 52 and below the surface of the liquid 32 through which fluid may be admitted to the pump from the more clean fluid lying near the top of the tank 16. A separator plate or baffle 54 is secured transversely across the liquid reservoir 16 beneath the surface of the liquid 32 to prevent undue disturbance of the liquid within the tank 16, as by vibrational or other effects, and to enable the settling out of foreign particles deposited therein from the air cleaner 12.

The air cleaner assembly 10 is easily assembled in a compact unit which may be readily associated with any type of air induction equipment within a limited amount of space. The drive motor 36 operates the pump 14 to supply liquid to the baffle chamber 20. The force of the inducted air passing over the baffle surface carries liquid from the baffle chamber 20 into the air cleaner 12 and wets the filter material 22. The wetted filter material 22 traps impurities from the inducted air and separates them out, leaving the clean air to pass on. The liquid carried over into the air cleaner 12 is diverted outwardly towards the periphery of the filter material 22 washing the impurities held in the filter material ahead of its path of travel. The force of air centrally through the air cleaner 12 creates a reduced pressure within the reservoir 16 and about the passages 26 leading thereto. Such lower pressure assists the drainage of excess liquid and entrained impurities through the passages 26 and into the reservoir. The circulation of liquid through the air cleaner is continuous. Clean liquid is drawn from near the top of the liquid while contaminated liquid is being returned to allow settling out of the impurities.

I claim:

1. An air cleaner assembly for automotive use which includes a liquid bath air cleaner having a filter housing and a liquid sump disposed beneath said filter housing, a liquid reservoir and settling tank secured to said air cleaner, said sump being disposed within said tank, means for carrying over liquid from said sump into said filter housing, means for draining excess liquid from said filter housing into said tank, and pump means mounted within said tank and connected to said sump for circulating liquid from said tank to said sump.

2. An air cleaner assembly comprising a liquid bath air cleaner including a liquid retaining sump, means for carrying over liquid from said sump into said air cleaner, a liquid retaining tank secured to said air cleaner, means for draining excess liquid from said air cleaner into said tank, and pump means mounted within said tank and having the inlet side thereof disposed beneath the surface of said liquid and the outlet side thereof connected to said sump of said air cleaner, said pump means being adapted to supply liquid from said tank to said sump and said draining means being adapted to drain back into said tank excess liquid carried over from said sump into said air cleaner.

3. Vehicle engine air cleaner means which includes a forced feed liquid bath air cleaner having a filter housing and a liquid retaining sump provided therein, said sump being disposed directly beneath said filter housing, a separate liquid retaining reservoir and settling tank secured beneath said air cleaner, means provided within said air cleaner for draining excess liquid carried over from said sump into said filter housing to said tank for settling out foreign matter picked up by said liquid within said air cleaner and for providing more clean liquid within said reservoir for return to said air cleaner, pump means disposed within said tank and having the inlet side thereof disposed at a level to be covered by said more clean liquid, and means disposed within said tank and connecting the outlet side of said pump means to said liquid sump of said air cleaner for replenishing the liquid depleted from said sump in the operation of said air cleaner.

References Cited in the file of this patent

UNITED STATES PATENTS

| | | |
|---|---|---|
| 2,396,526 | Nilsson | Mar. 12, 1946 |
| 2,537,495 | Wallin | Jan. 9, 1951 |
| 2,559,053 | Wallace | July 3, 1951 |
| 2,585,440 | Collins | Feb. 12, 1952 |
| 2,601,519 | Hardy et al. | June 24, 1952 |

FOREIGN PATENTS

| | | |
|---|---|---|
| 171,031 | Switzerland | Nov. 1, 1934 |